United States Patent [19]

Ohnishi et al.

[11] Patent Number: 5,365,521
[45] Date of Patent: Nov. 15, 1994

[54] DATA TRANSMISSION AND TRANSMISSION PATH SETTING AMONG EXCHANGE MODULES IN BUILDING BLOCK TYPE EXCHANGER

[75] Inventors: Hirokazu Ohnishi; Shinji Yasuda, both of Saitama; Kiminori Shinozaki, Tokyo; Kouji Kogure, Tokyo; Shigehiko Suzuki, Tokyo, all of Japan

[73] Assignee: Nippon Telegraph and Telephone Corporation, Tokyo, Japan

[21] Appl. No.: 19,103

[22] Filed: Feb. 18, 1993

[30] Foreign Application Priority Data

Feb. 20, 1992 [JP] Japan .................................. 4-069322
Feb. 20, 1992 [JP] Japan .................................. 4-069323
Feb. 26, 1992 [JP] Japan .................................. 4-039679

[51] Int. Cl.5 .......................................... H04Q 11/04
[52] U.S. Cl. ..................................... 370/60; 370/60.1; 370/94.1; 370/110.1
[58] Field of Search ................... 370/60, 60.1, 94.1, 370/110.1

[56] References Cited

U.S. PATENT DOCUMENTS

| | | | |
|---|---|---|---|
| 3,856,993 | 12/1974 | Closs et al. | 179/15 AT |
| 4,926,416 | 5/1990 | Weik | 370/60.1 |
| 4,972,465 | 11/1990 | Cline et al. | 379/279 |
| 5,119,370 | 6/1992 | Terry | 370/60.1 |

FOREIGN PATENT DOCUMENTS 3143098 6/1991 Japan ........................... H04Q 11/04

OTHER PUBLICATIONS

English abstract of Japanese Patent No. 3-143098.
English version of the search report from the EPO.

*Primary Examiner*—Douglas W. Olms
*Assistant Examiner*—Russell W. Blum
*Attorney, Agent, or Firm*—Allegretti & Witcoff

[57] ABSTRACT

A data transmission among the exchange modules in the building block type exchanger with improved efficiency, reliability and simplicity of implementation. An ATM connector is connected to the STM exchange module connector through at least one STM transmission line containing logical transmission paths provided in correspondence to the logical STM transmission path for transmission of specific data connected from each exchange module to the STM exchange module connector and fixedly switched by the STM exchange module connector to the logical transmission paths of the STM transmission line connected to the ATM connector. The specific data to be transmitted from each exchange module are transmitted in a form of ATM cells to the ATM connector, while all the specific data to be transmitted to each exchange module are multiplexed in a form of multiplexed ATM cells at the ATM connector and the multiplexed ATM cells are transmitted from the ATM connector to each exchange module.

20 Claims, 9 Drawing Sheets

DATA TRANSMISSION AND TRANSMISSION PATH SETTING AMONG EXCHANGE MODULES IN BUILDING BLOCK TYPE EXCHANGER

BACKGROUND OF THE INVENTION

1. Field of the Invention

The present invention relates to a building block type exchanger in which a plurality of exchange modules are connected through an exchange module connector, and more particularly, to a data transmission and a transmission path setting among the exchange modules in such a building block type exchanger.

2. Description of the Background Art

A building block type exchanger is an exchanger formed by a plurality of exchange modules as blocks, where each exchange module is connected with external subscriber lines or relay transmission lines and the exchange modules are mutually connected in the exchanger by an exchange module connector having a cross-connect function for directing data transmitted from one input path to a desired output path. The examples of the exchange module connector to be used here include an STM (Synchronous Transfer Mode) exchange module connector and ATM (Asynchronous Transfer Mode) exchange module connector.

Here, each exchange module itself is a small unit exchanger, and the reason for building a larger exchanger (building block type exchanger) by accumulating a plurality of smaller unit exchangers as blocks is to unify the architecture of the exchangers regardless of their sizes such that the exchanger of any desired size can be constructed by using the same type of unit exchangers.

For such a building block type exchanger, there are two conventionally known methods for the transmission of the control data among the exchange modules in the exchanger.

One method is to use the STM exchange module connector and the STM paths exclusively allocated for the control data transmission which are to be provided between each exchange module and the STM exchange module connector.

The other method is to use the ATM exchange module connector in which the data are transmitted in units cells, where each cell has a fixed cell length and a header indicating the destination of each cell.

However, these two conventionally known methods for transmission of the control data among the exchange modules in the exchanger are associated with the problems.

Namely, the method using the STM exchange module connector has the problem in that, in order to provide the STM path between the STM exchange module connector and each one of the exchange modules in the exchanger, as many as (a number of exchange modules in the exchanger)×(a number of STM paths required for the transmission of the control data between any two exchange modules) of the STM paths exclusively allocated for the control data transmission must be provided in the exchanger, while the bandwidth required for the transmission of the control data between any two exchange modules is actually less than the bandwidth of a single STM path, so that the utilization efficiency of all these STM paths exclusively allocated for the control data transmission as a whole becomes quite low.

Moreover, as the number of exchange modules exchanger increases, some of these STM paths becomes actually wasteful because there is a limit to a number of exchange modules with which each exchange module can exchange the control data simultaneously due to the limited capacity of the processor.

In addition, as the number of exchange modules in the exchanger increases, a number of I/O interfaces required to be provided on each exchange module also increases, and this in turn causes a complication of the hardware and the software of the exchanger as well as an increase of the cost of the exchanger.

Furthermore, the cost required for the control data transmission lines increases in proportion to (burstyness of the control data transmission)×(a number of exchange modules in the exchanger), and this fact is potentially problematic as the burstyness of the control data transmission is expected to increase in future because the diversity of the services which are expected to be accommodated. This problem is more troublesome because the cost of the transmission line is generally higher than cost of the exchanger itself. The expected increase of the burstyness also reduces the utilization efficiency of the control data transmission lines, so that this method is expected to be rather poor in terms of the cost performance.

On the other hand, the method using the ATM exchange module connector has the problem in that it becomes necessary to provide a high speed and wide bandwidth (about 156 Mb/s) ATM path exclusively allocated for the transmission of the control data between each exchange module and the ATM exchange module connector, so that the utilization efficiency of the ATM paths can be quite low whenever the bandwidth required by the transmission of the control data is not so wide. This problem will be particularly severe in view of the aforementioned expected increase of the burstyness of the control data transmissions. In addition, the ATM exchange module connector will be quite large sized because of all these ATM paths to be provided, even when the size of the exchanger itself is not so large. Consequently, this method is also expected to have a rather poor cost performance as it demands rather large investment for the exchanger.

Furthermore, the problem mentioned above in relation to the previous method regarding the increase of the cost required for the control data transmission lines is also present in this method, and this can make this method even poorer in the cost performance.

Now, in such a conventional building block type exchanger, the setting of the capacity of the transmission path between any two exchange modules has been managed by the exchange modules autonomously, according to the time variation of the communication traffic between these two exchange modules, by making a negotiation between these two exchange modules about the capacity that can be allocated to that transmission path and then controlling the STM exchange module connector according to the agreement reached by the negotiation.

However, this manner of setting the capacity of the transmission path is associated with the following problems.

First, when such an autonomous management of the transmission path capacity by the exchange modules themselves is adopted, because the STM exchange module connector has a finite transmission capacity, there are cases in which the desired amount of the transmission capacity cannot be secured for some exchange modules because of the transmission capacities already used by the other exchange modules, in which cases the required set up quality such as a call loss rate cannot be satisfied for some exchange modules.

Secondly, in a case of setting up a new transmission path capacity, there are cases in which the required call set up quality cannot be satisfied during a period of time between the making of the request for the set up of the new transmission path capacity and the actual allocation of the requested new transmission path capacity.

Thirdly, when the available transmission capacity at the STM exchange module connector is little, a new transmission path capacity cannot be set up when it becomes necessary, even when there is a transmission path whose utilization efficiency is low, so that the utilization efficiency of the transmission capacity of the STM exchange module connector as a whole cannot be improved.

On the other hand, in such a conventional building block type exchanger, the set up or the release of the transmission path between any two exchange modules is made by either one of the following two methods.

(1) The exchange module connector makes the set up or the release by judging the appropriate timing for the set up or the release.

(2) One of the exchange modules makes a request for the set up or the release to the exchange module connector by judging the appropriate timing for the set up or the release, and then the exchange module connector in turn makes a request for the set up or the release to the other one of the exchange modules.

However, these methods for the set up or the release of the transmission path are associated with the following problems.

Namely, in the method (1), it is necessary for the exchange module connector to be equipped with a function and a mechanism for the regular centralized monitoring of the utilization states of the transmission paths, as well as a function and a mechanism for carrying out the set up and the release of the transmission path and the associated set up data to be used between the transmission path and the exchange module. Here, the set up data must be updated every time the addition or the deletion of the exchange module is made in the exchanger, and this can lead to the decrease of the reliability due to the potential for making a mistake at a time of the updating of the set up data as well as to the complication of the operation required for the set up or the release. In addition, the reliability of the exchange module connector is also reduced because of the increase of its hardware required by the incorporation of a function and a mechanism for the regular centralized monitoring.

As for the method (2), it is also necessary for the exchange module connector to be equipped with the set up data to be used between the transmission path and the exchange module, so that the problem of the reliability mentioned above for the method (1) is also present. In addition, in this method (2), there are possibilities For two exchange modules to make the requests for the same set up or release simultaneously to the exchange module connector such that the exchange module connector carries out two equivalent set up or release operations in unnecessary duplication.

SUMMARY OF THE INVENTION

It is therefore an object of the present invention to provide a method of a data transmission among the exchange modules in the building block type exchanger, capable of preventing a complication of the hardware and the software of the exchanger even when a number of exchange modules in the exchanger increases, while also preventing a decrease of the cost performance of the exchanger due to the reduced data transmission path utilization efficiency.

It is another object of the present invention to provide a building block type exchanger capable of carrying out the above mentioned method of a data transmission among the exchange modules according to the present invention.

It is another object of the present invention to provide a method of transmission path setting among the exchange modules in the building block type exchanger, capable of always guaranteeing the required set up quality and increasing the utilization efficiency of the transmission capacity of the exchange module connector as a whole.

It is another object of the present invention to provide a method of transmission path setting among the exchange modules in the building block type exchanger, in which the set up data to be used between the transmission path and the exchange module becomes unnecessary, and the unnecessary duplicated set up or release of two equivalent transmission lines can be avoided.

According to one aspect of the present invention there is provided a method of data transmission among exchange modules in a building block type exchanger in which the exchange modules are mutually connected by an STM (Synchronous Transfer Mode) exchange module connector having a cross-connect function, the method comprising the step of: connecting each of the exchange modules to the STM exchange module connector through at least one logical transmission line containing at least one logical STM transmission path for transmission of specific data; connecting an ATM (Asynchronous Transfer Mode) connector to the STM exchange module connector through a leas one STM transmission line containing logical transmission paths provided in correspondence to said at least one logical STM transmission path for transmission of specific data connected from at least one of the exchange modules; fixedly switching said at least one logical STM transmission path for transmission of specific data connected from said at least one of the exchange modules by the STM exchange module connector to the logical transmission paths of said at least one STM transmission line; transmitting the specific data to be transmitted from said at least one of the exchange modules in a form of ATM cells to the ATM connector, through said at least one logical STM transmission path for transmission of specific data connected from said at least one of the exchange modules, the STM exchange module connector, and said at least one STM transmission line; and multiplexing all the specific data to be transmitted to said at least one of the exchange modules in a form of multiplexed ATM cells at the ATM connector and transmitting the multiplexed ATM cells from the ATM connector to said at least one of the exchange modules, through said at least one STM transmission line, the STM exchange module connector, and said at least one logical STM transmission path for transmission of specific data connected from said at least one of the exchange modules.

According to another aspect of the present invention there is provided a building block type exchanger, comprising: at least one exchange module; an STM (Synchronous Transfer Mode) exchange module connector having a cross-connect function connected to said at least one exchange module through at least one logical STM transmission line containing at least one logical STM transmission path for transmission of specific data; an ATM (Asynchronous Transfer Mode) connector connected to the STM exchange module connector through at least one STM transmission line containing logical transmission paths provided in correspondence to said at least one logical STM transmission path for transmission of specific data; wherein said at least one logical STM transmission path for transmission of specific data is fixedly switched to the logical transmission paths of said at least one STM transmission line by the STM exchange module connector, such that the specific data to be transmitted from said at least one exchange module is transmitted in a form of ATM cells to the ATM connector through said at least one logical STM transmission path for transmission of specific data, the STM exchange module connector, and said at least one STM transmission line, while all the specific data to be transmitted to said at least one exchange module are multiplexed in a form of multiplexed ATM cells at the ATM connector and the multiplexed ATM cells are transmitted from the ATM connector to said at least one exchange module through said at least one STM transmission line, the STM exchange module connector, and said at least one logical STM transmission path for transmission of specific data, Other features and advantages of the present invention will become apparent from the following description taken in conjunction with the accompanying drawings.

DETAILED DESCRIPTION OF THE PREFERRED EMBODIMENTS

Figure 1:
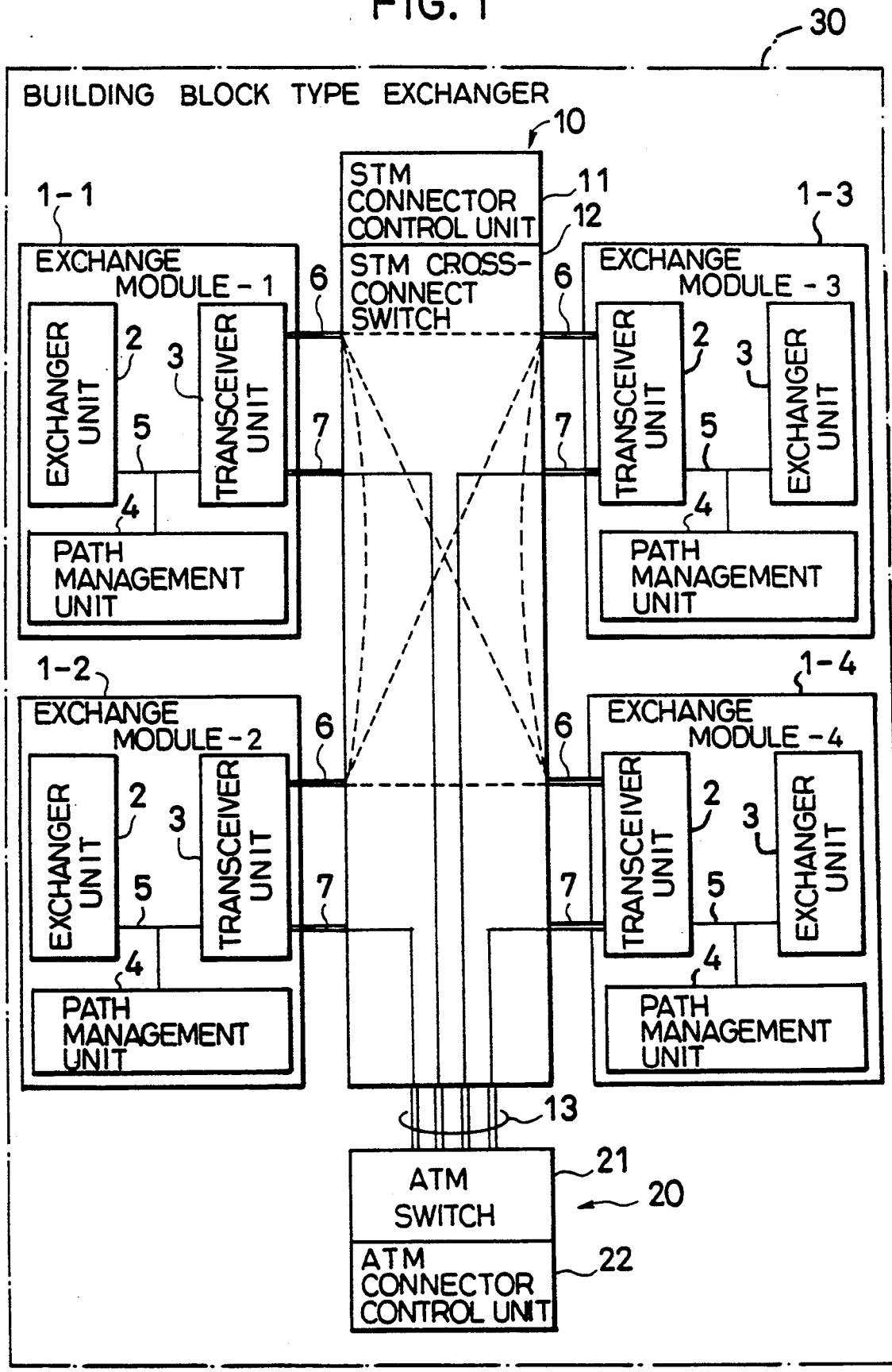
FIG. 1 is a schematic block diagram of a building block type exchanger for carrying out one embodiment of a method of a data transmission among the exchange modules according to the present invention.

Referring now to FIG. 1, one embodiment of a method of a data transmission among the exchange modules according to the present invention will be described in detail.

FIG. 1 shows an exemplary configuration of a building block type exchanger 30 for carrying out the method of a data transmission among the exchange modules according to the present invention.

More specifically, this building block type exchanger 30 comprises: four exchange modules 1-1, 1-2, 1-3, and 1-4 (also referred collectively as exchange modules 1 hereinbelow), each of which includes an exchanger unit 2, a transceiver unit 3, and a path management unit 4, which are mutually connected by an internal path 5; an STM exchange module connector 10 including an STM connector control unit 11 for controlling the operation of the STM exchange module connector 10 and an STM cross-connect switch 12; and an ATM connector 20 including an ATM switch 21 and an ATM connector control unit 22 for controlling the operation of the ATM connector 20.

Each of the exchange modules 1-1, 1-2, 1-3, and 1-4 is connected to the STM exchange module connector 10 by a communication path 6 for transmitting communication data and a control data path 7 for transmitting control data, where the communication paths 6 are cross-connected within the STM cross-connect switch 12 as indicated by dashed lines in FIG. 1, such that the communication data transmitted from one communication path 6 can be directed to a desired one of the other communication paths 6.

On the other hand, the control data paths 7 are fixedly switched in the STM cross-connect switch. 12 to an STM transmission line 13 connecting the STM cross-connect switch 12 and the ATM switch 21 as indicated by solid lines in FIG. 1.

Each of the communication path 6 and the control data path 7 is a logical STM path having a transmission capacity of 1.5 Mb/s×N, where N is an integer indicating a number of unit STM paths required for the transmission of the control data between any two exchange modules 1 which depends on the amount of the control data to be transmitted. In a case N is greater than two, the STM cross-connect switch 12 may carry out the cross-connect function in units of groups of paths. Also, each of the communication path 6 and the control data path 7 may contain a plurality of channels.

In practice, the communication path 6 and the control data path 7 are contained in the same physical STM transmission line connecting between the exchange module 1 and the STM exchange module connector 10.

The STM transmission line 13 contains four logical STM paths in correspondence to four control data paths 7 from the four exchange modules 1-1, 1-2, 1-3, and 1-4. In terms of the capacity, this STM transmission line 13 has a transmission capacity which is four times the cross-connecting speed of the STM cross-connect switch 12.

It is to be noted here that the number of exchange modules 1 in the exchanger 30 can be set to be any desired number, and the additional exchange module can be connected to the STM exchange module connector 10 in a manner similar to that described above for the exchange modules 1.

In this building block type exchanger of FIG. 1, the communication data are transmitted between any two exchange modules 1 by utilizing the cross-connect function of the STM cross-connect switch 12, just as in the conventional building block type exchanger. Namely, by making the negotiation between two exchange modules 1 about the capacity that can be allocated to the communication paths 6 to be used in transmitting the communication data and then controlling the STM exchange module connector 10 according to the agreement reached by the negotiation, such that the communication data can be transmitted from the exchanger unit 2 of one exchange module 1 through the internal paths 5, the transceiver units 3, and the communication paths 6, to the exchanger unit 2 of the other exchange module 1.

On the other hand, the control data are transmitted from each exchange module 1 through the control data path 7, the STM transmission line 13, and the ATM switch 21 of the ATM connector 20. Here, each exchange module 1 transmits the control data to the control data path 7 in a form of ATM cells, while the ATM switch 21 which received the control data through the STM transmission line 13 from any number of the exchange modules 1 multiplexes all the control data destined to each exchange module 1 in a form of ATM cells and transmits the multiplexed ATM cells of all the control data destined to each exchange module 1 through the STM transmission line 13 and the control data path 7 connected to that each exchange module 1. In this control data transmission, no negotiation between the exchange modules 1 is necessary as the control data paths 7 are set up to be fixedly switched to the ATM connector 20 at a time of the activation of the system.

Thus, in this embodiment, the STM paths contained in the STM transmission line 13 are shared by a plurality of exchange modules 1, so that the number of STM paths required in the exchanger 30 can be reduced compared with a conventional method for the transmission of the control data using the STM exchange module connector, while there is also no need to provide any ATM path in the exchanger 30. Consequently, it is possible in this embodiment to prevent a complication of the hardware and the software of the exchanger even when a number of exchange modules 1 in the exchanger 30 increases, In addition, because the same STM transmission line 13 is shared by all the exchange modules 1, the utilization efficiency of the STM transmission line 13 as a whole can be maintained to be fairly high, even in view of the expected increase of the burstyness of the control data transmission in future, so that it is possible in this embodiment to prevent a decrease of the cost performance of the exchanger due to the reduced data transmission path utilization efficiency.

Furthermore, in this embodiment, the STM transmission line 13 has a so called concatenation, which can easily be maintained even when the number N of control data paths 6

It is to be noted here that the method of data transmission described above is applicable not only for the data transmission among the exchange modules in the exchanger, but also for the data transmission among the other modules to be used for the purpose of maintenance an activation of the exchange modules such as trunk modules, as well as for the data transmission among the exchange modules of one exchanger and the exchange modules of the other exchanger.

It is also to be noted that the method of data transmission described above may be applied to the data other than the control data, such as the communication data and operation data.

It is further to be noted that the method of data transmission described above may be applied to only a selected number of exchange modules in the exchanger, while the remaining exchange modules in the exchanger use the conventional method of data transmission.

Now, various embodiments of a method of a transmission path setting among the exchange modules suitable for a building block type exchanger according to the present invention will be described in detail.

Figure 2:
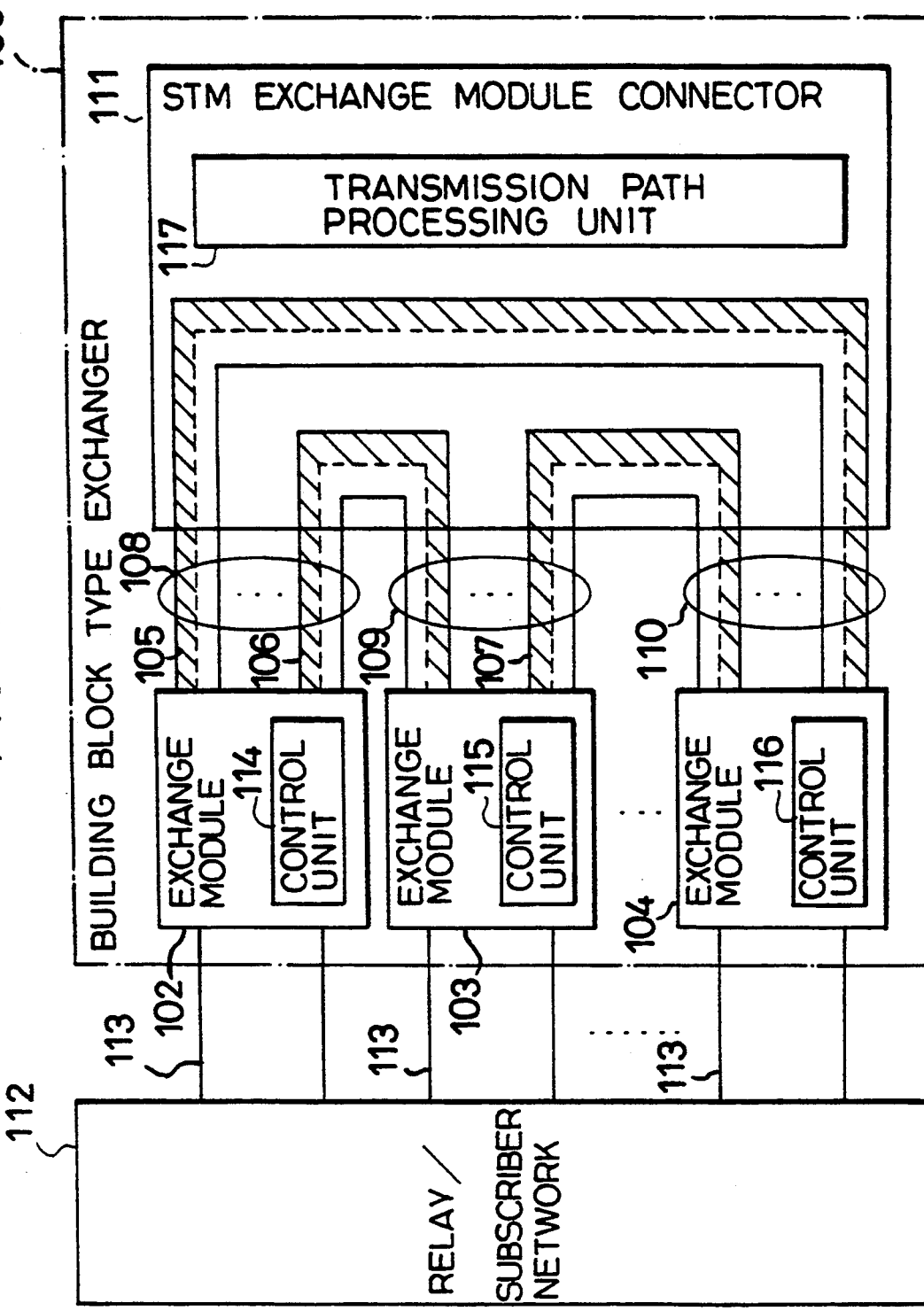
FIG. 2 is a schematic block diagram of a building block type exchanger for carrying out first to fifth embodiments of a method of a transmission path setting among the exchange modules according to the present invention.

FIG. 2 shows an exemplary configuration of a building block type exchanger 100 for carrying out the method of a transmission path setting among the exchange modules according to the present invention.

More specifically, this building block type exchanger 100 comprises: three exchange modules 102, 103, and 104, which include transmission path control units 114, 115, and 116, respectively, and which are connected with an external relay/subscriber network 112 through subscriber lines 113; and an STM exchange module connector 111 including a transmission path processing unit 117.

In this configuration of FIG. 2, the exchange module 102 and the exchange module 104 are connected through a logical transmission line 105, the exchange module 102 and the exchange module 103 are connected through a logical transmission line 106, and the exchange module 103 and the exchange module 104 are connected through a logical transmission line 107, where the logical transmission lines 105, 106, and 107 are provided between the respective exchange modules through the STM exchange module connector 111. In practice, the exchange module 102 is connected with the STM exchange module connector 111 through a physical STM transmission line 108 containing logical STM transmission lines 105 and 106, the exchange module 103 is connected with the STM exchange module connector 111 through a physical STM transmission line 109 containing logical STM transmission lines 106 and 107, and the exchange module 104 is connected with the STM exchange module connector 111 through a physical STM transmission line 110 containing logical STM transmission lines 105 and 107, as indicated in FIG. 2.

In this configuration of FIG. 2, the set up and the release of the transmission paths in each of the logical transmission lines 105, 106, and 107 are carried out by the transmission path control units 114, 115, and 116 of the exchange modules 102, 103, and 104, respectively, and the transmission path processing unit 117 of the STM exchange module connector 111.

It is to be noted here that the number of exchange modules in the exchanger 100, which is three in FIG. 2, is irrelevant to the present invention and can be set to be any desired number.

Figure 3:
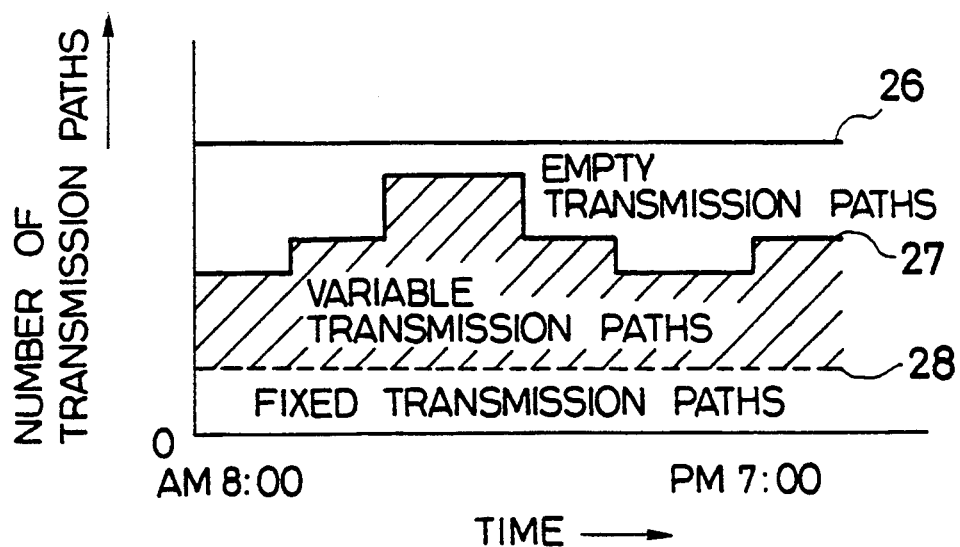
FIG. 3 is a diagram of a time variation of the number of transmission paths set up in the logical transmission line according to the first embodiment of a method of a transmission path setting among the exchange modules according to the present invention.

Referring now to FIG. 3, a first embodiment of a method of a transmission path setting among the exchange modules according to the present invention will be described in detail.

In this first embodiment, the transmission line capacity (i.e., a number of transmission paths) of each of the logical transmission lines 105, 106, and 107 is logically divided into two categories of fixed transmission paths whose number is maintained to be stable regardless of the time variation of the communication traffic between the exchange modules, and variable transmission paths whose number can be varied according to the time variation of the communication traffic between the exchange modules.

FIG. 3 shows a time variation of the number of transmission paths set up in any one of the logical transmission lines 105, 106, and 107. In FIG. 3, a line 26 indicates a maximum number of logical transmission paths that can be set up in each logical transmission line, a line 27 indicates a number of transmission paths that are actually set up in each logical transmission line, and line 28 indicates a number of the fixed transmission paths provided in each logical transmission line. Thus, a shaded region between the lines 27 and 28 indicates the number of the variable transmission paths that are actually set up in each logical transmission line, while a region between the lines 26 and 27 indicates the number of empty transmission paths in each logical transmission line.

In this first embodiment, when the exchanger 100 activated initially, the fixed transmission paths are automatically set up in each of the logical transmission lines 105, 106, and 107, by the transmission path control units 114, 115, and 116 of the exchange modules 102, 103, and 104, respectively, and the transmission path processing unit 117 of the STM exchange module connector 111.

Then, when a call from the exchange module 102 to the exchange module 104 is generated by the relay/subscriber network 112 and there is not enough transmission paths for this call available among the fixed transmission paths in the logical transmission line 105, the additional transmission paths required by this call are set up in the logical transmission line 105 in a form of the variable transmission paths, by the transmission path control units 114, 115, and 116 of the exchange modules 102, 103, and 104, respectively, and the transmission path processing unit 117 of the STM exchange module connector 111.

On the other hand, when the available number transmission paths in the other logical transmission line in the same physical transmission line such as the logical transmission line 106 is in short of the need, the number of transmission paths in the logical transmission line 105 is reduced as much as possible by releasing the variable transmission paths.

Thus, even when the number of traffic paths for the logical transmission line 105 reaches to the maximum number 26 of logical transmission paths that can be set up in each logical transmission line, the communication through the other logical transmission line in the same physical transmission line 108 such as the logical transmission line 106 can be secured by the fixed transmission paths set up in the logical transmission line 106, so that the required set up quality for the communication between the exchange modules through any logical transmission line can always be guaranteed.

In addition, as the transmission paths can be interchanged between the logical transmission lines in the same physical transmission line by using the variable transmission paths, the utilization efficiency of the transmission line capacity of the STM exchange module connector 111 as a whole can be increased and therefore the size of the STM exchange module connector can be reduced.

Furthermore, according to this first embodiment, it is sufficient for the exchanger to be designed to set up a predetermined number of the fixed transmission paths in every logical transmission line uniformly, so that the designing of the exchanger becomes easier.

It is to be noted that the number of fixed transmission paths may be set to be zero for some logical transmission line, if desired.

Figure 4:
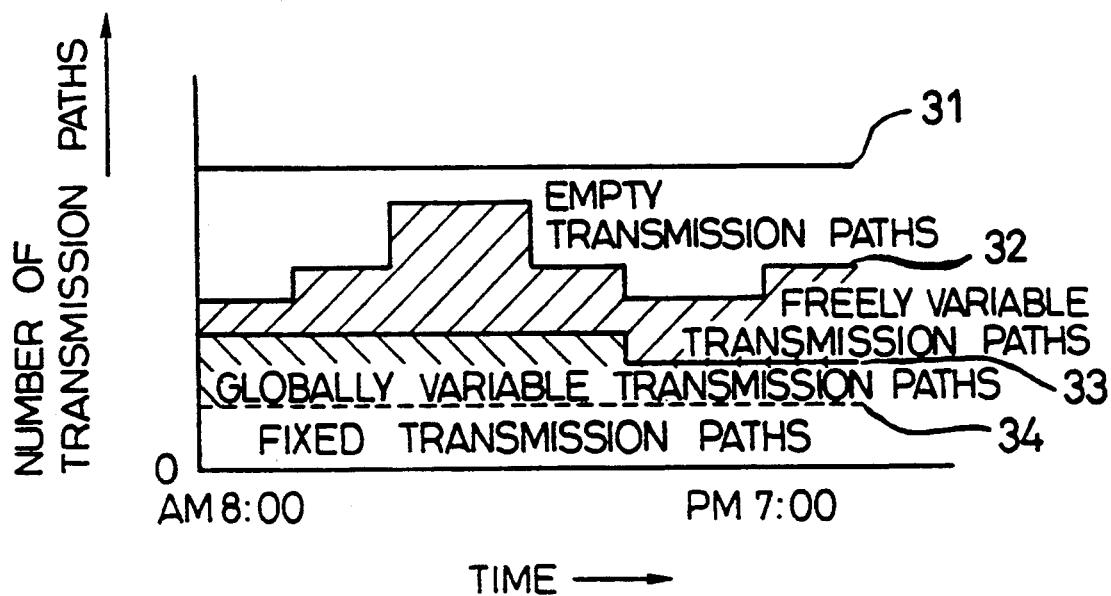
FIG. 4 is a diagram of a time variation of the number of transmission paths set up in the logical transmission line according to the second embodiment of a method of a transmission path setting among the exchange modules according to the present invention.

Referring now to FIG. 4, a second embodiment of a method of a transmission path setting among the exchange modules according to the present invention will be described in detail.

In this second embodiment, the category of the variable transmission paths used in the first embodiment described above is further divided logically into two categories of freely variable transmission paths whose number can be freely varied according to the time variation of the communication traffic between the exchange modules, and globally variable transmission paths whose number is variable only in a global time scale according to the global time variation of the communication traffic between the exchange modules. More specifically, the freely variable transmission paths are varied in accordance with the instantaneous communication traffic evaluated in units of relatively short time periods such as seconds, minutes, and hours, or whenever the call is generated, whereas the globally variable transmission paths are varied in accordance with the statistical communication traffic evaluated in units of relatively long time periods such as days, weeks, months, and years.

FIG. 4 shows a time variation of the number of transmission paths set up in any one of the logical transmission lines 105, 106, and 107, similarly to FIG. 3 described above. In FIG. 4, a line 31 indicates a maximum number of logical transmission paths that can be set up each logical transmission line, a line 32 indicates a number of transmission paths that are actually set up in each logical transmission line, a line 33 indicates a total number of the fixed transmission paths and the globally variable transmission paths that are actually set up in each logical transmission line, and a line 34 indicates a number of the fixed transmission paths provided in each logical transmission line. Thus, a shaded region between the lines 32 and 33 indicates the number of the freely variable transmission paths that are actually set up in each logical transmission line, and a shaded region between the lines 33 and 34 indicates the number of the globally variable transmission paths that are actually set up in each logical transmission line, while a region between the lines 31 and 32 indicates the number of empty transmission paths in each logical transmission line.

In this second embodiment, when the available number of transmission paths in one logical transmission line is in short of the need, the freely variable transmission paths available at the other logical transmission lines in the same physical transmission line as that one logical transmission line can be interchanged with that one logical transmission line instantaneously, but the globally variable transmission paths available at the other logical transmission lines in the same physical transmission line as that one logical transmission line cannot be interchanged with that one logical transmission line instantaneously.

On the other hand, by determining the number of the globally variable transmission paths according to the past communication traffic records and the required set up quality, the globally variable transmission paths can be interchanged among the logical transmission lines in the same physical transmission line, when there are unnecessary or rarely used globally variable transmission paths.

Thus, in this second embodiment, the fixed transmission paths as well as the globally variable transmission paths are unaffected by the communication traffics among the other exchange modules, so that the set up quality for the communication between the exchange modules through any logical transmission line can be guaranteed at higher levels than the first embodiment described above.

It is to be noted that either one or both of the number of fixed transmission paths and the number off globally variable transmission paths may be set to be zero for some logical transmission line, if desired.

Figure 5:
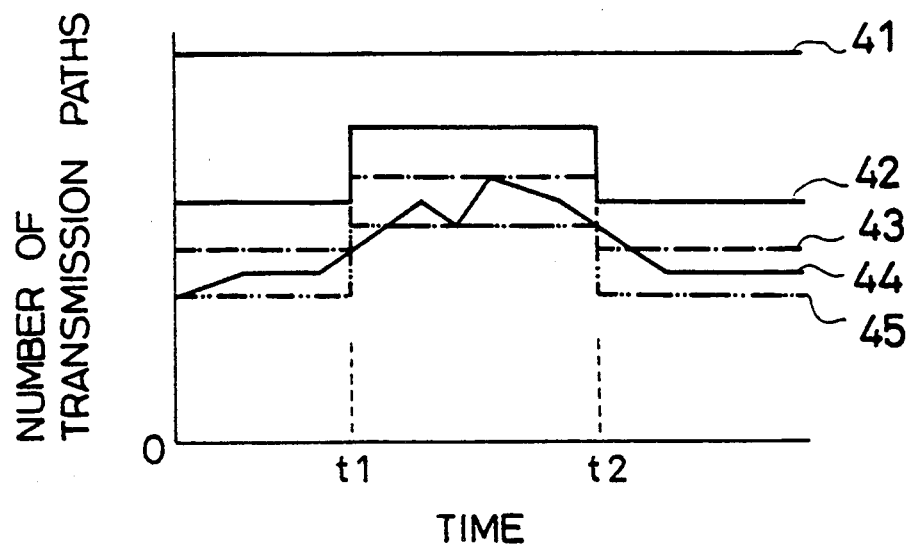
FIG. 5 is a diagram of a time variation of the number of transmission paths set up in the logical transmission line according to the third embodiment of a method of a transmission path setting among the exchange modules according to the present invention.

Referring now to FIG. 5, a third embodiment of a method of a transmission path setting among the exchange modules according to the present invention will be described in detail.

In this third embodiment, the set up and the release of transmission paths in each of the logical transmission lines 105, 106, and 107 is made according to the relationships of the number of transmission paths that are currently used in each logical transmission line with respect to the thresholds for the set up and the release.

FIG. 5 shows a time variation of the number of transmission paths set up in any one of the logical transmission lines 105, 106, and 107. In FIG. 5, a line 41 indicates a maximum number of logical transmission paths that can be set up in each logical transmission line, a line 42 indicates a number of transmission paths that are actually set up in each logical transmission line, a line 43 indicates a threshold for the set up of transmission paths, a line 44 indicates a number of transmission paths that are currently used in each logical transmission line, and a line 45 indicates a threshold for the release of transmission paths.

In this third embodiment, the number 44 of transmission paths that are currently used in each logical transmission line is monitored at regular intervals, and compared with the thresholds 43 and 45 for the set up and the release.

When the number 44 of transmission paths that are currently used in each logical transmission line becomes larger than the threshold 43 for the set up of transmission paths at a time t1, the number 42 of transmission paths that are actually set up in each logical transmission line is increased by setting up new transmission paths. In conjunction with this set up of new transmission paths, the thresholds 43 and 45 for the set up and the release are also updated to account for the number of new transmission paths.

On the other hand, when the number 44 of transmission paths that are currently used in each logical transmission line becomes smaller than the threshold 45 for the release of transmission paths at a time t2, while the available number of transmission paths in the other logical transmission line in the same physical transmission line is in short of the need, the number 42 of transmission paths that are actually set up in each logical transmission line is decreased by releasing some transmission paths, such that the available transmission paths can be interchanged from one logical transmission line to the other logical transmission line. In conjunction with this release of some transmission paths, the thresholds 43 and 45 for the set up and the release are also updated to account for the number of released transmission paths. Here, by setting the threshold 45 for the release to be sufficiently lower than the threshold 43 for the set up, it is possible to prevent the number of transmission paths that are actually set up in each logical transmission line from becoming higher than the threshold 43 for the set up by the small fluctuation of the transmission data quantity, soon after the release of the transmission paths took place.

According to this third embodiment, the required set up quality can be satisfied during a period of time between the making of the request for the set up of the new transmission paths and the actual allocation of the requested new transmission paths by using reserve transmission paths provided between the number 42 of transmission paths that are actually set up in each logical transmission line and the threshold 43 for the set up of transmission paths, so that the required set up quality for the communication between the exchange modules through any logical transmission line can always be guaranteed.

It is to be noted that by determining the thresholds 43 and 45 for the set up and the release with respect to the number 42 of transmission paths that are actually set up in each logical transmission line as described above, the identical number of reserve transmission paths will become available regardless of the size of the transmission line capacity.

It is also to be noted that the thresholds 43 and 45 for the set up and the release may be determined with respect to the number of unused channels in the transmission paths in each logical transmission line.

Alternatively, by determining the thresholds 43 and 45 for the set up and the release in accordance with the utilization rate of the transmission paths that are actually set up in each logical transmission line, or with the utilization rate of the unused channels in the transmission paths in each logical transmission line, it becomes possible to distribute the reserve transmission paths among the logical transmission lines according to their transmission line capacities, which is suitable when the communication traffic varies in proportion to the size of the transmission line capacities provided between the exchange modules.

It is also to be noted that this embodiment may be modified such that the number of unused transmission paths in each logical transmission line is monitored and the thresholds 43 and 45 for the set up and the release are determined with respect to the number of unused transmission paths in each logical transmission line, or the utilization rate of unused transmission paths in each logical transmission line. In this case, the threshold 43 for the set up is set to be lower than the threshold 45 for the release. With this modification, it becomes possible to prevent the lowering of the transmission rate for the transmission data which require a plurality of transmission paths because a certain minimum number of unused transmission paths can be secured in each logical transmission line all the time. In addition, in this case, it is only necessary to monitor the number of the unused transmission paths in each logical transmission line, so that the monitoring can be made more easily. Here, by setting the threshold 45 for the release to be sufficiently higher than the threshold 43 for the set up, it is possible to prevent the number of unused transmission paths from becoming lower than the threshold 43 for the set up by the small fluctuation of the transmission data quantity, soon after the release of the transmission paths took place.

Figure 6:
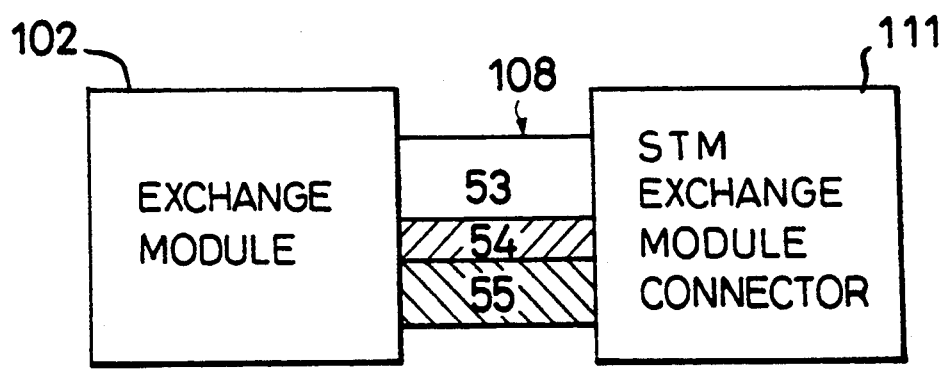
FIG. 6 is a diagram of a part of the building block type exchanger of FIG. 2, showing transmission paths in the logical transmission line according to the fourth embodiment of a method of a transmission path setting among the exchange modules according to the present invention.

Referring now to FIG. 6, a fourth embodiment of a method of a transmission path setting among the exchange modules according to the present invention will be described in detail.

In this fourth embodiment, the set up and the release of transmission paths in each of the logical transmission lines 105, 106, and 107 is made by using the empty transmission paths pooled collectively at a single logical region in each physical transmission line exclusively for this purpose.

FIG. 6 shows the logical internal configuration of the physical transmission line 108 between the exchange module 102 and the STM exchange module connector 111, as an example to illustrate this fourth embodiment in FIG. 6, the physical transmission line 108 contains a logical region 53 for pooling the empty transmission paths collectively as the pooled transmission paths, a logical region 54 for the logical transmission paths set up for the logical transmission line 105 between the exchange module 102 and the exchange module 104, and a logical region, 55 for the logical transmission paths set up for the logical transmission line 106 between the exchange module 102 and the exchange module 103.

In this fourth embodiment, when the number of unused transmission paths set up for any logical transmission line becomes greater than a predetermined threshold such as one half of all the transmission paths set up for this logical transmission line, the unused transmission paths in excess of this threshold are released as the empty transmission paths and pooled in the logical region 53 as the pooled transmission paths.

Then, when the available number of transmission paths in any logical transmission line in this physical transmission line 108 is in short of the need, as many transmission paths as necessary are taken from the pooled transmission paths in the logical region 53 and set up as the new transmission paths for that logical transmission line.

Here, the pooled transmission paths are known to be available for the set up of new transmission paths in any logical transmission line, so that the new transmission paths can be fetched more quickly from the pooled transmission paths, compared with the interchanging of the transmission paths among the logical transmission lines which involves the negotiation between the exchange modules, so that it becomes possible in this fourth embodiment to deal with a sudden need of a large number of new transmission paths.

Figure 7:
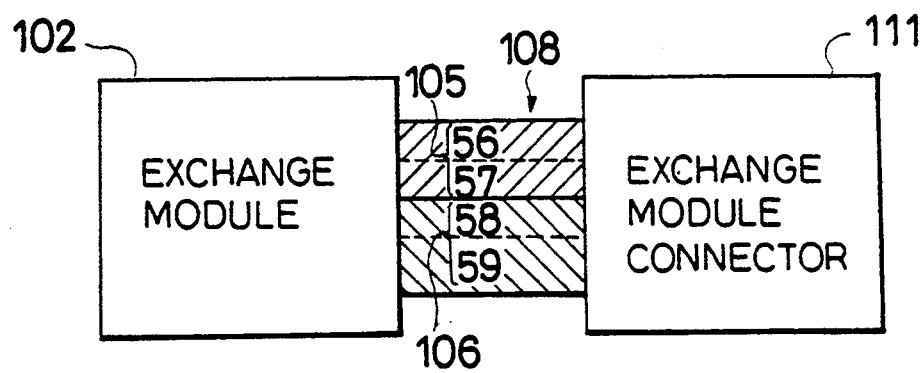
FIG. 7 is a diagram of a part of the building block type exchanger of FIG. 2, showing transmission paths in the logical transmission line according to the fifth embodiment of a method of a transmission path setting among the exchange modules according to the present invention.

Referring now to FIG. 7, a fifth embodiment of a method of a transmission path setting among the exchange modules according to the present invention will be described in detail.

In this fifth embodiment, the set up and the release of transmission paths in each of the logical transmission lines 105, 106, and 107 is made by using the empty transmission paths pooled collectively at a single logical region in each logical transmission line exclusively for this purpose.

FIG. 7 shows the logical internal configuration of the physical transmission line 108 between the exchange module 102 and the STM exchange module connector 111, as an example to illustrate this fifth embodiment. In FIG. 7, the physical transmission line 108 contains the logical transmission line 105 between the exchange module 102 and the exchange module 104 including a logical region 86 for the empty logical transmission paths available for the logical transmission line 105 and a logical region 57 for the logical transmission paths currently set up for the logical transmission line 105, and the logical transmission line 106 between the exchange module 102 and the exchange module 103 including a logical region 58 for the empty logical transmission paths available for the logical transmission line 106 and a logical region 59 for the logical transmission paths currently set up for the logical transmission line 106.

In this fifth embodiment, when the number of unused transmission paths set up for the logical transmission line 105 or 106 becomes greater than a predetermined threshold such as one half of all the transmission paths set up for this logical transmission line 105 or 106, the unused transmission paths in excess of this threshold are released as the empty transmission paths and pooled in the logical region 56 or 58 as the pooled transmission paths.

Then, when the available number of transmission paths in this logical transmission line 105 or 106 in this physical transmission line 108 is in short of the need, as many transmission paths as necessary are taken from the pooled transmission paths in the logical region 56 or 58 and set up as the new transmission paths for that logical transmission line 105 or 106.

Figure 8:
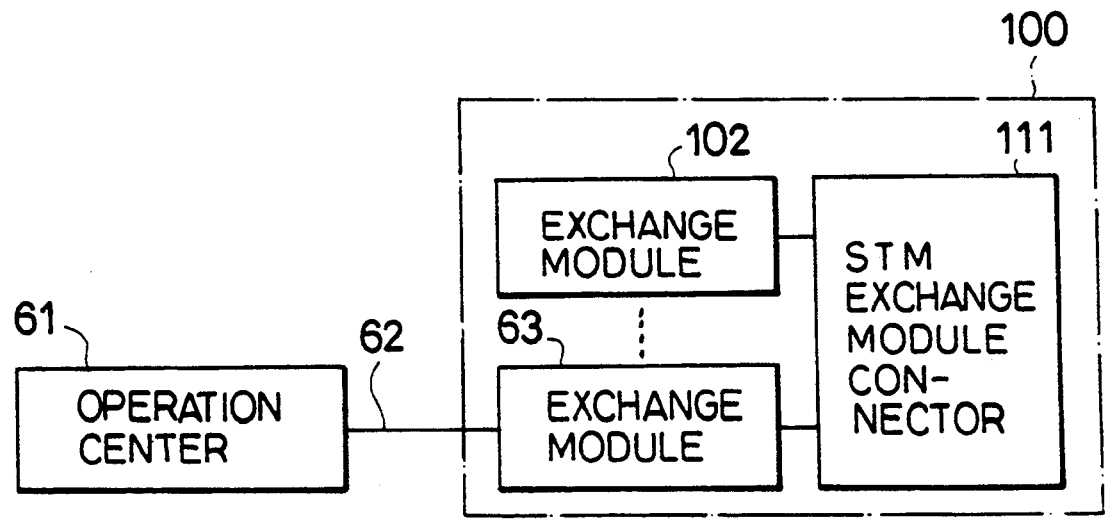
FIG. 8 is a schematic block diagram of a building block type exchanger for carrying out a sixth embodiment of a method of a transmission path setting among the exchange modules according to the present invention.

On the other hand, when the number of the pooled transmission paths in the logical region 56 or 58 of one logical transmission line 105 or 106 in this physical transmission line 108 is in short of the need, the pooled transmission paths can be taken from the pooled transmission paths in the logical region 58 or 56 of the other logical transmission line 106 or 105 in this physical transmission line 108, Referring now to FIG. 8, a sixth embodiment of a method of a transmission path setting among the exchange modules according to the present invention will be described in detail.

In this sixth embodiment, the second embodiment described above is modified such that the number of the fixed transmission paths and the number of the globally variable transmission paths, i.e., the number of those transmission paths which cannot be interchanged with the other logical transmission lines, are determined by an operation center for managing the entire communication network.

Namely, as shown in FIG. 8, in this sixth embodiment, the building block type exchanger 100 shown in FIG. 2 is further equipped with an exchange module 63 connected with an externally located operation center 61 through an operation center line 62.

Here, the operation center 61 can determine the appropriate number of the fixed transmission paths and the appropriate number of the globally variable transmission paths for each logical transmission line according to the past communication traffic records. The determined numbers of the fixed transmission paths and the globally variable transmission paths are then transmitted to each exchange module in the exchanger 100 through the exchange module 63 such that the set up of the fixed transmission paths and the globally variable transmission paths is carried out according to the appropriate numbers for these transmission paths determined by the operation center 61.

The operation center 61 also judges the appropriate timings for updating the appropriate number of the globally variable transmission paths and updates the appropriate number of the globally variable transmission paths to be transmitted to the exchange module 63 at the judged timings.

Thus, in this sixth embodiment, the number of those transmission paths which can be interchanged with the other logical transmission lines is managed autonomously by each exchange module, while the number of those transmission paths which cannot be interchanged with the other transmission lines is managed by an operation center for managing the entire communication network, such that becomes possible to manipulate the set up quality various logical transmission lines appropriately. In addition, the reliability can be improved as the management of the transmission line capacity is shared by the operation center and the exchange modules.

Now, various embodiments of a procedure for a transmission path set up among the exchange modules suitable for a building block type exchanger according to the present invention will be described in detail.

Figure 9:
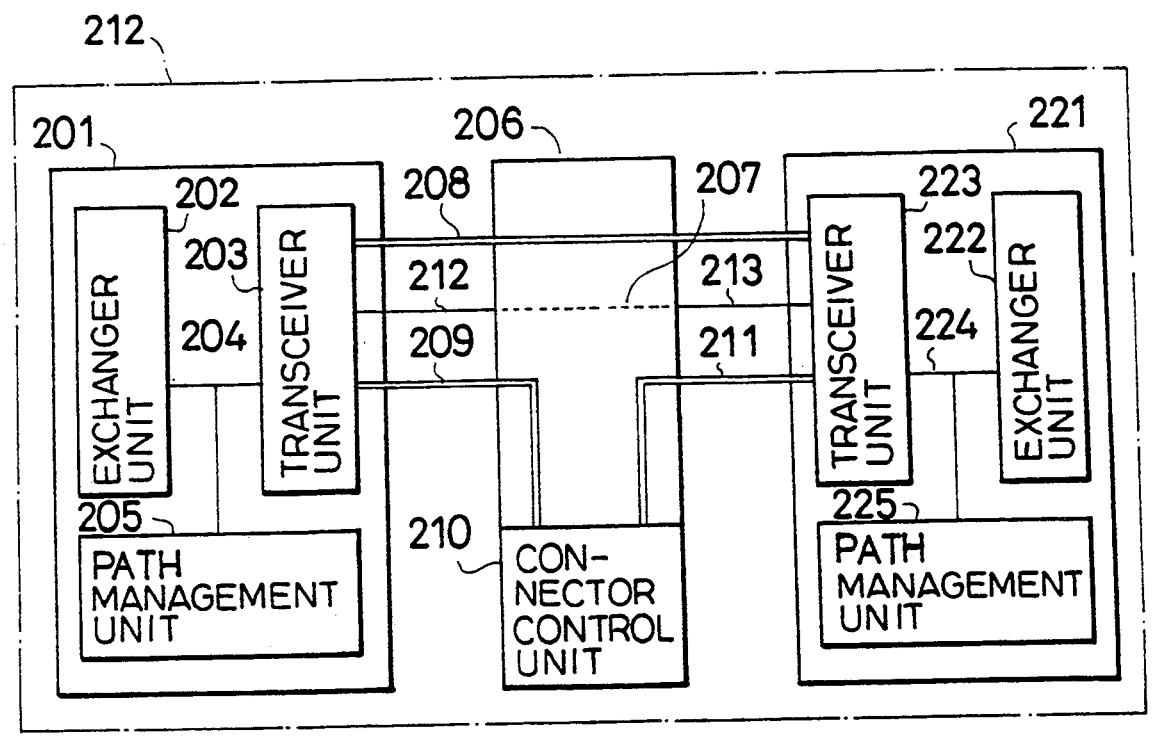
FIG. 9 is a schematic block diagram of a building block type exchanger for carrying out a first embodiment of a procedure for a transmission path set up among the exchange modules according to the present invention.
Figure 10:
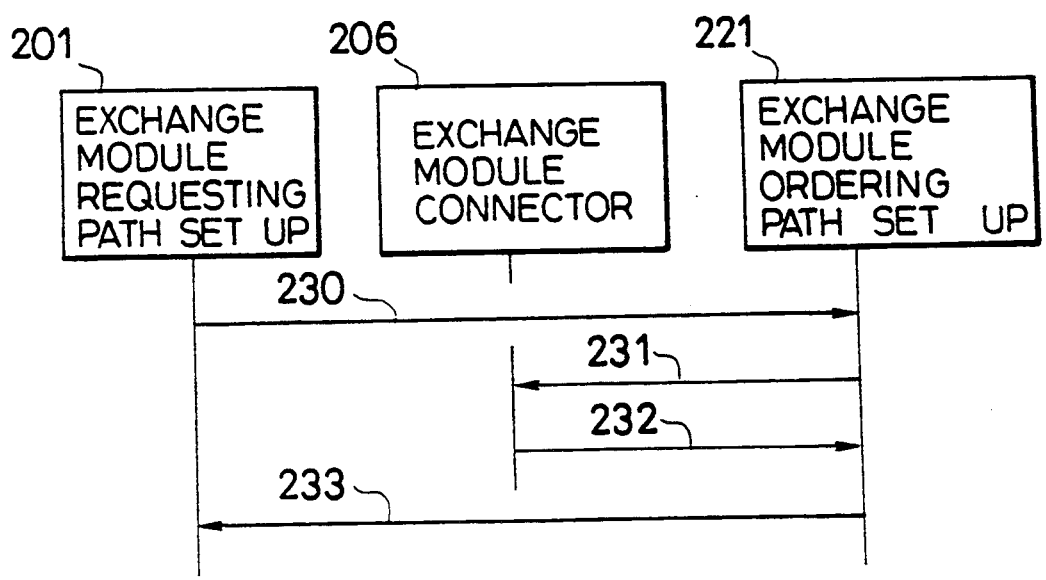
FIG. 10 is a sequence diagram for the first embodiment of a procedure for a transmission path set up among the exchange modules according to the present invention.

Referring first to FIG. 9 and FIG. 10, a first embodiment of a procedure for a transmission path set up among the exchange modules suitable for a building block type exchanger according to the present invention will be described in detail.

FIG. 9 shows an exemplary configuration of a building block type exchanger 212 for carrying out this first embodiment of a procedure for a transmission path set up among the exchange modules according to the present invention.

More specifically, this building block type exchanger 212 comprises: two exchange modules 201 and 221 including exchanger units 202 and 222, transceiver units 203 and 223, and path management units 205 and 225, respectively, which are mutually connected by internal paths 204 and 224, respectively; and an exchange module connector 206 including a connector switch unit 207 and a connector control unit 210 for controlling the operation of the exchange module connector 206.

Each of the exchange modules 201 and 221 is connected with each other by a control path 208 for transmitting control data between the exchange modules 201 and 221 through the exchange module connector 206. In addition, the exchange module 201 is connected to the connector control unit 210 of the exchange module connector 206 through a control path 209, while the exchange module 221 is connected to the connector control unit 211 of the exchange module connector 206 through a control path 210. These control paths 208, 209, and 210 are fixedly set up at a time of an activation of the system, so that they are not set up or released during the operation of this exchanger 212.

On the other hand, the exchange modules 201 and 221 are also connected to the connector switch unit 207 of the exchange module connector 206 through the communication transmission lines 212 and 213 containing transmission paths for transmitting communication data between the exchange modules 201 and 221, respectively, which are connected with each other within the connector switch unit 207. The transmission paths in the communication transmission lines 212 and 213 can be set up or released at any time during the operation of this exchanger 212.

Now, the first embodiment of a procedure for a transmission path set up among the exchange modules according to the present invention is carried out in accordance with a sequence diagram shown in FIG. 10, as follows.

The path management unit 205 of the exchange module 201 monitors the state of utilization of the transmission paths in the communication transmission line 212 with respect to the exchange module 221 either regularly or whenever requested. As a result of this monitoring, when the path management unit 205 judges a need for setting up new transmission paths as the empty transmission paths in the communication transmission line 212 is found to be in short of the need or the utilization rate of the transmission paths in the communication transmission line 212 is found to be very high, the path management unit 205 transmits a path set up request message 230 containing path IDs of new transmission paths to be set up in the communication transmission line 212 and a number of new transmission paths to be set up, from the transceiver unit 203, through the control path 208, to the transceiver unit 223 of the other exchange module 212.

In response, the path management unit 225 of the exchange module 212 reads the content of the path set up request message 230 and judges whether the set up of the new transmission paths requested by this path set up request message 230 is possible or not.

When it is judged to be possible to set up the new transmission paths as requested by the path set up request message 230, the path management unit 225 transmits a path set up order message 231 containing the path IDs of the transmission paths to be set up in the communication transmission line 212 and the path IDs of the transmission paths to be set up in the communication transmission line 213, from the transceiver unit 223, through the control path 211, to the connector control unit 210 of the exchange module connector 206.

In response, the connector control unit 210 reads the content of the path set up order message 231, and controls the exchange module connector 206 to set up the transmission paths of the path IDs ordered by the path set up order message 231 in the communication transmission lines 212 and 213 and connect them by the connector switch unit 207. Then, the connector control unit 210 returns a response message 232 indicating the completion of the set up of the ordered new transmission paths, through the control path 211 and the transceiver unit 223, to the path management unit 225 of the exchange module 221 from which the path set up order message was received.

Finally, the path management unit 225 of the exchange module 221 transmits a notification message 233 indicating the completion of the set up of the requested new transmission paths, through the transceiver unit 223, the control path 208, and the transceiver unit 203, to the path management unit 205 of the exchange module 201 from which the path set up request message was received.

It is to be noted that the releasing of the transmission paths can be achieved in the similar procedure using the path release request message and the path release order message instead of the path set up request message and the path set up order message.

Thus, according to this first embodiment, a function and a mechanism for the monitoring of the utilization state of the transmission paths are provided on each one of the exchange modules, i.e., the centralized monitoring function is distributed among the exchange modules, such that the exchange modules can manage the set up and the release of the transmission paths autonomously, and the set up data to be used between the transmission paths and the exchange modules become unnecessary, so that the exchange module connector is required to be equipped only with a function and a mechanism for carrying out the set up and the release of the transmission paths, and consequently it becomes possible to prevent the reduction of the reliability of the exchange module connector as well as the complication of the operation required in the transmission path set up or release procedure.

In addition, the set up or the release of the transmission paths are made by the negotiation between the exchange modules in a form of exchange of various messages, so that it also becomes possible to prevent the unnecessary duplicated set up or release of two equivalent transmission paths.

Figure 11:
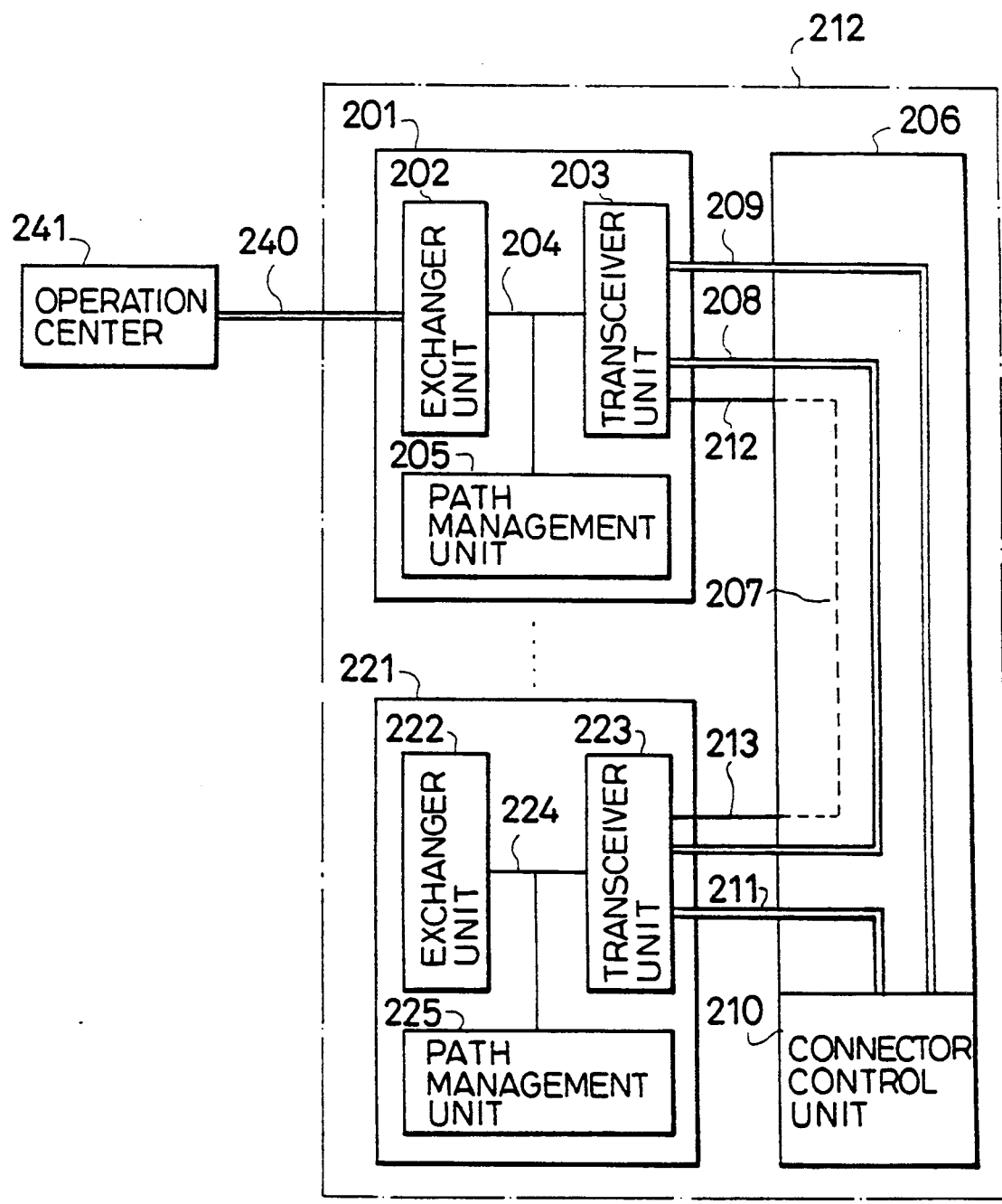
FIG. 11 is a schematic block diagram of a building block type exchanger for carrying out a second embodiment of a procedure for a transmission path set up among the exchange modules according to the present invention.
Figure 12:
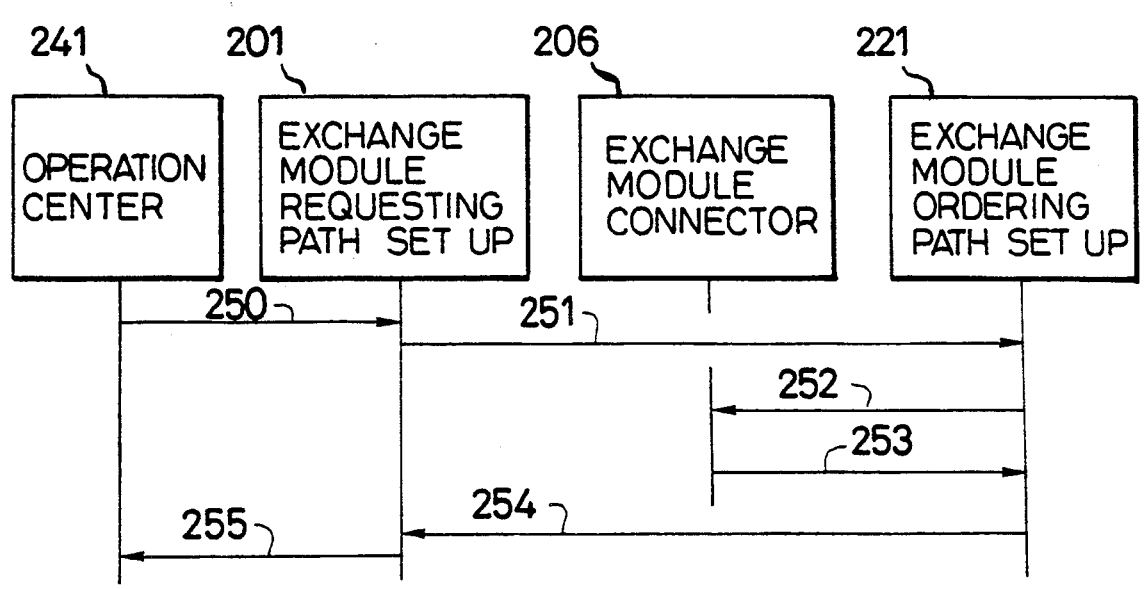
FIG. 12 is a sequence diagram for the second embodiment of a procedure for a transmission path set up among the exchange modules according to the present invention.

Referring now to FIG. 11 and FIG. 12, a second embodiment of a procedure for a transmission path set up among the exchange modules suitable for a building block type exchanger according to the present invention will be described in detail. Here, those elements which are substantially equivalent to the corresponding elements in the first embodiment described above will be given the same reference numerals and their descriptions will be omitted.

FIG. 11 shows an exemplary configuration of a building block type exchanger 212 for carrying out this second embodiment of a procedure for a transmission path set up among the exchange modules according to the present invention. This configuration of FIG. 11 differs from that shown in FIG. 9 for the first embodiment described above in that the exchanger unit 202 of the exchange module 201 is connected to an externally located operation center 241 for managing the entire communication network through a control path 240.

In this second embodiment, the operation center 241 judges the timing for the set up and the release of the transmission paths in all or a selected number of the communication transmission lines among the exchange modules, and orders one of the exchange modules to which the transmission paths to be set up or released is connected to carry out the actual set up or release of the transmission paths.

More specifically, the second embodiment of a procedure for a transmission path set up among the exchange modules according to the present invention is carried out in accordance with a sequence diagram shown in FIG. 12, as follows.

The operation center 241 judges the timing for the set up of the transmission paths in the communication transmission lines 212 and 213 between the exchange modules 201 and 221, and transmits a path set up command message 250 commanding the set up of the transmission paths, through the control path 240 and the exchanger unit 202 of the exchange module 201, to the path management unit 205 of the exchange module 201.

In response, the path management unit 205 of the exchange module 201 transmits a path set up request message 251 similar to the path set up request message 230 used in the first embodiment, from the transceiver unit 203, through the control path 208, to the transceiver unit 223 of the other exchange module 212. Thereafter, the procedure similar to that of the first embodiment described above is carried out by the exchange module connector 206 and the exchange modules 201 and 221, using a path set up order message 252, a response message 253, and a notification message 254, similar to the path set up order message 231, the response message 232, and the notification message 233 used in the first embodiment.

Then, when the notification message 254 is received from the path management unit 225 of the exchange module 221, the path management unit 205 of the exchange module 201 transmits a report message 255 indicating the completion of the set up of the transmission paths as commanded by the path set up command message 250, through the exchanger unit 202 and the control path 240, to the operation center 241.

It is to be noted that the releasing of the transmission paths can be achieved in the similar procedure using the path release command message, the path release request message and the path release order message instead of the path set up command message, the path set up request message and the path set up order message.

It is also to be noted that, in a case the operation center 241 judges the timing for the set up and the release of the transmission paths in only a selected number of the communication transmission lines among the exchange modules, the set up and the release of the transmission paths in the remaining communication transmission lines among the exchange modules not controlled under the operation center 241 can be handled in the manner of the first embodiment described above.

Thus, according to this second embodiment, the effects similar to those described in conjunction with the first embodiment above can also be achieved.

Figure 13:
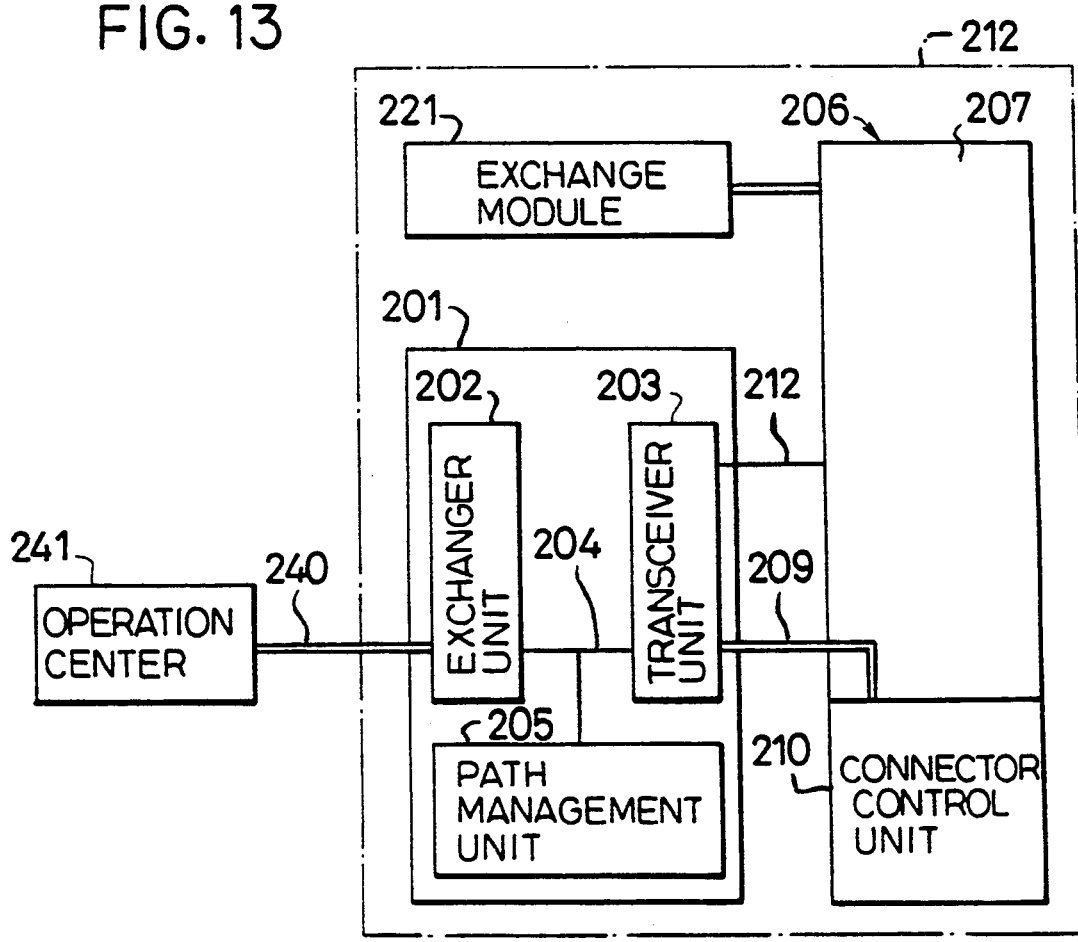
FIG. 13 is a schematic block diagram of a building block type exchanger for carrying out a third embodiment of a procedure for a transmission path set up among the exchange modules according to the present invention.
Figure 14:
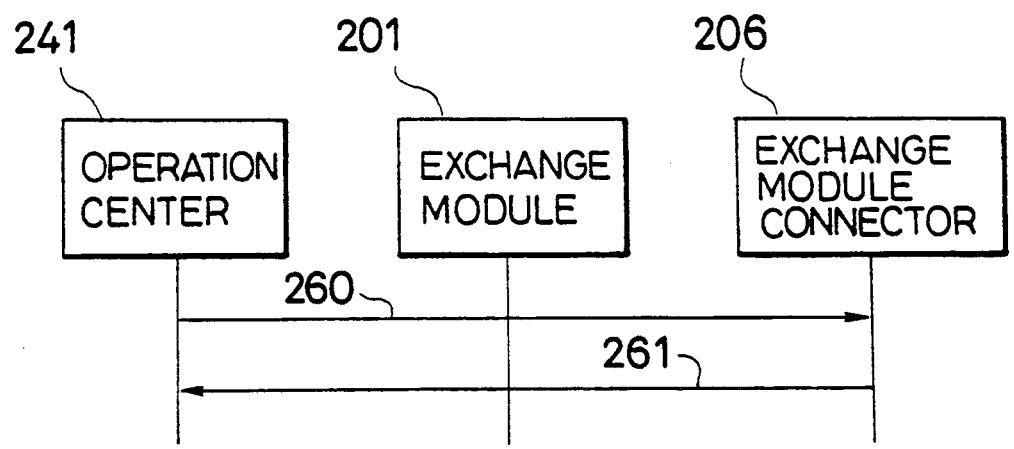
FIG. 14 is a sequence diagram for the third embodiment of a procedure for a transmission path set up among the exchange modules according to the present invention.

Referring now to FIG. 13 and FIG. 14, a third embodiment of a procedure for a transmission path set up among the exchange modules suitable for a building block type exchanger according to the present invention will be described in detail. Here, those elements which are substantially equivalent to the corresponding elements in the first and second embodiments described above will be given the same reference numerals and their descriptions will be omitted.

FIG. 13 shows an exemplary configuration of a building block type exchanger 212 for carrying out this third embodiment of a procedure for a transmission path set up among the exchange modules according to the present invention.

In this third embodiment, the operation center 241 judges the timing for the set up and the release of the transmission paths in all or a selected number of the communication transmission lines among the exchange modules, and orders the exchange module connector 206 to carry out the actual set up or release of the transmission paths, through the exchange module 201.

More specifically, the third embodiment off a procedure for a transmission path set up among the exchange modules according to the present invention is carried out in accordance with a sequence diagram shown in FIG. 14, as follows.

The operation center 241 judges the timing for the set up of the transmission paths in the communication transmission line 212 of the exchange modules 201 with respect to the exchange module 221, and transmits a path set up command message 260 commanding the set up of the transmission paths, which includes the path IDs of the transmission paths to be set up, through the control path 240, the exchanger unit 202, internal path 204, and the transceiver unit 203 of the exchange module 201, and the control path 209 to the connector control unit 210 of the exchange module connector 206.

In response, the connector control unit 210 reads the content of the path set up command message 260, and controls the exchange module connector 206 to set up the transmission paths of the path IDs commanded by the path set up command message 260 in the communication transmission lines 212 and connect them by the connector switch unit 207.

Then, the connector control unit 210 returns a report message 261 indicating the completion of the set up of the commanded new transmission paths, through the control path 209, the exchanger unit 202, internal path 204, and the transceiver unit 203 of the exchange module 201, and the control path 240, to the operation center 241.

It is to be noted that the releasing off the transmission paths can be achieved in the similar procedure using the path release command message instead of the bath set up command message.

It is also to be noted that, in a case the operation center 241 judges the timing for the set up and the release of the transmission paths in only a selected number of the communication transmission lines among the exchange modules, the set up and the release of the transmission paths in the remaining communication transmission lines among the exchange modules not controlled under the operation center 241 can be handled in the manner of the first embodiment described above.

Thus, according to this third embodiment, the effects similar to those described in conjunction with the first embodiment above can also be achieved.

Figure 15:
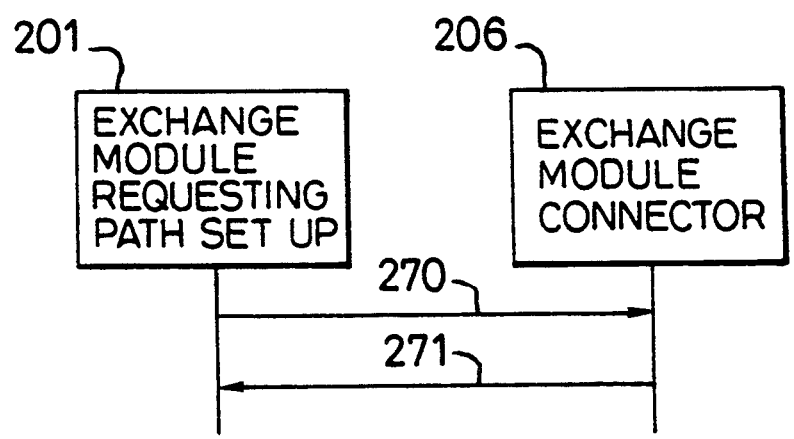
FIG. 15 is a sequence diagram for a fourth embodiment of a procedure for a transmission path set up among the exchange modules according to the present invention.

Referring now to FIG. 15, a fourth embodiment of a procedure for a transmission path set up among the exchange modules suitable for a building block type exchanger according to the present invention will be described in detail. Here, those elements which are substantially equivalent to the corresponding elements in the first embodiment described above will be given the same reference numerals and their descriptions will be omitted.

In this fourth embodiment, in the configuration substantially similar to that shown in FIG. 9, the exchange module 201 autonomously manages the timing for the set up and the release of the transmission paths in the communication transmission lines connected to the exchange module connector 206, and orders the exchange module connector 206 to carry out the actual set up or release of the transmission paths.

More specifically, the fourth embodiment of a procedure for a transmission path set up among the exchange modules according to the present invention is carried out in accordance with a sequence diagram shown in FIG. 14, as follows.

The path management unit 205 of the exchange module 201 monitors the state of utilization of the transmission paths in the communication transmission line 212 with connected to the exchange module connector 206 and judges the timing for the set up of the transmission paths in the communication transmission line 212. When the path management unit 205 judges that the set up of new transmission paths in the communication transmission line 212 is necessary, the path management unit 205 transmits a path set up command message 270 commanding the set up of the transmission paths, which includes the path IDs of the transmission paths to be set up, through the exchanger unit 202 and the transceiver unit 203 of the exchange module 201 and the control path 209, to the connector control unit 210 of the exchange module connector 206.

In response, the connector control unit 210 reads the content of the path set up command message 270, and controls the exchange module connector 206 to set up the transmission paths of the path IDs commanded by the path set up command message 270 in the communication transmission lines 212 and connect them by the connector switch unit 207.

Then, the connector control unit 210 returns a report message 271 indicating the completion of the set up of the commanded new transmission paths, through the control path 209 and the exchanger unit 202 and the transceiver unit 203 of the exchange module 201, to the path management unit 205 of the exchange module 201.

It is to be noted that the releasing of the transmission paths can be achieved in the similar procedure using the path release command message instead of the path set up command message.

Thus, according to this fourth embodiment, the effects similar to those described in conjunction with the first embodiment above can also be achieved.

It is to be noted that, although the method of a transmission path setting among the exchange modules and the procedure for a transmission path set up among the exchange modules are described above separately for the sake of clarity of explanation, they can be applied together on the same building block type exchanger.

In addition, the method of a transmission bath setting among the exchange modules and the procedure for a transmission path set up among the exchange modules described above are also effectively applicable to any type of an exchanger other than a building block type exchanger according to the present invention, so that either one or is both of them can be used independently from the building block type exchanger according to the present invention as described above.

It is further to be noted that, besides those already mentioned, many modifications and variations of the above embodiments may be made without departing from the novel and advantageous features of the present invention. Accordingly, all such modifications and variations are intended to be included within the scope of the appended claims.

What is claimed is:

1. A method of data transmission among exchange modules in a building block type exchanger in which the exchange modules having transmission path set up/release functions are mutually connected by an STM exchange module connector having a cross-connect function, the method comprising the steps of:

connecting each of the exchange modules to the STM exchange module connector through at least one logical STM transmission line containing at least one logical STM transmission path for transmission of specific data;

connecting an ATM connector to the STM exchange module connector through at least one logical STM transmission line containing logical transmission paths provided in correspondence to said at least one logical STM transmission path for transmission of specific data connected from at least one of the exchange modules;

fixedly switching said at least one logical STM transmission path for transmission of specific data connected from said at least one of the exchange modules by the STM exchange module connector to the logical transmission paths of said at least one STM transmission line;

transmitting the specific data to be transmitted from said at least one of the exchange modules in a form of ATM cells to the ATM connector, through said at least one logical STM transmission path for transmission of specific data connected from said at least one of the exchange modules, the STM exchange module connector, and said at least one STM transmission line; and multiplexing all the specific data to be transmitted to said at least one of the exchange modules in a form of multiplexed ATM cells at the ATM connector and transmitting the multiplexed ATM cells from the ATM connector to said at least one of the exchange modules through said at least one STM transmission line, the STM exchange module connector, and said at least one logical STM transmission path for transmission of specific data connected from said at least one of the exchange modules.

2. The method of claim 1, wherein the specific data include at least one of communication data, control data, and operation data.

3. The method of claim 1, wherein said at least one STM transmission line has a transmission capacity equal to a cross-connecting speed of the STM exchange module connector multiplied by an integer.

4. The method of claim 1, further comprising the steps of:

cross-connecting each logical STM transmission path contained in said at least one logical STM transmission line connected from each one of the exchange modules excluding said at least one of the exchange modules by the STM exchange module connector to each logical STM transmission path contained in said at least one logical STM transmission line connected from other ones of the exchange modules excluding said at least one of the exchange modules; and transmitting the specific data to be transmitted to and from said each one of the exchange modules excluding said at least one of the exchange modules, through said at least one logical STM transmission path for transmission of specific data in said at least one logical STM transmission line connected from said each one of the exchange modules excluding said at least one of the exchange modules and the STM exchange module connector.

5. The method of claim 1, wherein said at least one logical STM transmission line also contains at least one logical STM transmission path for transmission of data not belonging to the specific data, and the method further comprising the steps of:

cross-connecting said at least one logical STM transmission path for transmission of data not belonging to the specific data connected from said each one of the exchange modules by the STM exchange module connector to said at least one logical STM transmission path for transmission of data not belonging to the specific data connected from other ones of the exchange modules;

transmitting the data not belonging to the specific data to be transmitted to and from said each one of the exchange modules, through said at least one logical STM transmission path for transmission of data not belonging to the specific data in said at least one logical STM transmission line connected from said each one of the exchange modules and the STM exchange module connector.

6. The method of claim 1, wherein at the step of the exchange modules said each of the exchange modules is connected to the STM exchange module connector through said at least one logical STM transmission line which contains a fixed number of fixed transmission paths independent of time variation of communication traffic among the exchange modules and a variable number of variable transmission paths whose number varies according to the time variation of the communication traffic among the exchange modules.

7. The method of claim 6, at the step of connecting each of the exchange modules, said each of the exchange modules is connected to the STM exchange module connector through said at least one logical STM transmission line which contains the variable transmission paths, where the variable transmission paths includes globally variable transmission paths whose number varies according to global time variation of statistical communication traffic among the exchange modules said freely variable transmission paths whose number is independent of the global time variation of the statistical communication traffic among the exchange modules.

8. The method of claim 7, wherein the fixed number of the fixed transmission paths and the number of the globally variable transmission paths are determined by an operation center managing the building block type exchanger, while the number of the freely variable transmission paths determined by the exchange modules autonomously.

9. The method of claim 1, wherein a number of transmission paths contained in said at least one logical STM transmission line connected from said each of the exchange modules is controlled by said each of the exchange modules autonomously, by comparing any one of a number of currently used transmission paths and a number of currently unused transmission paths with thresholds for judging necessity of set up and release of the transmission paths, the thresholds being specified according to any one of a number of currently set up transmission paths, a number of currently unused transmission paths, a number of currently unused channels, a utilization rate of currently set up transmission paths, a utilization rate of currently unused transmission paths, and a utilization rate of currently unused channels.

10. The method of claim 1, wherein currently empty transmission paths in all of said at least one logical STM transmission line belonging to an identical physical transmission line are pooled collectively at a single logical region in the physical transmission line.

11. The method of claim 1, wherein currently empty transmission paths in said at least one logical STM transmission line are pooled collectively at a single logical region in said at least one logical STM transmission line.

12. The method of claim 1, wherein transmission paths contained in said at least one logical STM transmission line connected from one of the exchange modules and transmission paths contained in said at least one logical STM transmission line connected from another one of the exchange modules are set up/released by the steps of:

(a) transmitting a path set up/release request message from said one of the exchange modules to said another one of the exchange modules, the path set up/release request message specifying path IDs of the transmission paths to be set up/released in said at least one logical STM transmission line connected from said one of the exchange modules;

(b) judging whether it is possible to set up/release the transmission paths having the path IDs specified by the path set up/release request message transmitted at the step (a), at said another one of the exchange modules;

(c) when it is judged to be possible to set up/release the transmission paths at the step (b), transmitting a path set up/release order message from said another one of the exchange modules to the STM exchange module connector, the path set up/release order message specifying path IDs of the transmission paths to be set up/released in said at least one logical STM transmission line connected from said another one of the exchange modules, and the path IDs of the transmission paths to be set up/released in said at least one logical STM transmission line connected from said one of the exchange modules specified by the path set up/release request message transmitted at the step (a);

(d) carrying out set up/release of the transmission paths having the path IDs specified by the path set up/release order message transmitted at the step (c) in said at least one logical STM transmission line connected from said one of the exchange modules and said at least one logical STM transmission line connected from said another one of the exchange modules, at the STM exchange modules connector;

(e) when the set up/release of the transmission paths a the step (d) is completed, returning a response message from the STM exchange module connector to said another one of the exchange modules, the response message indicating a completion of set up/release of the transmission paths having the path IDs specified by the path set up/release order message transmitted at the step (c); and (f) in response to a reception of the response message transmitted at the step (e), returning a notification message from said another one of the exchange modules to said one of the exchange modules, the notification message indicating a completion of set up/release of the transmission paths having the path IDs specified by the path set up/release request message transmitted at the step (a).

13. The method of claim 12, further comprising the steps of:

(g) determining an appropriate timing for set up/release of the transmission paths between said one of the exchange modules and said another one of the exchange modules at an operation center managing the building block type exchanger, and transmitting a path set up/release command message from the operation center to said one of the exchange modules, the path set up/release command commanding the set up/release of the transmission paths between said one of the exchange modules and said another one of the exchange modules, such that said one of the exchange modules transmits the path set up/release request message at the step (a) in response to a reception of the path set up/release command message from the operation center; and (h) in response to a reception of the notification message transmitted at the step (f), returning a report message from said one of the exchange modules to the operation center, the report message indicating a completion of set up/release of the transmission paths commanded by the path set up/release command message transmitted at the step (g).

14. The method of claim 1, wherein transmission paths contained in said at least one logical STM transmission line connected from one of the exchange modules and transmission paths contained in said at least one logical STM transmission line connected from another one of the exchange modules are set up/released by the steps of:

(a) determining a necessity of set up/release of the transmission paths between one of the exchange modules and another one of the exchange modules at an operation center managing the building block type exchanger, and transmitting a path set up/release command message from the operation center to the STM exchange module connector, the path set up/release command message commanding the set up/release of the transmission paths between said one of the exchange modules and said another one of the exchange modules, and specifying path IDs of the transmission paths to be set up/released in said at least one logical STM transmission line connected from said another one of the exchange modules and the path IDs of the transmission paths to be set up/released in said at least one logical STM transmission line connected from said one of the exchange modules;

(b) carrying out the set up/release of the transmission paths having the path IDs specified by the path set up/release command message transmitted at the step (a) in said at least one logical STM transmission line connected from said one of the exchange modules and said at least one logical STM transmission line connected from said another one of the exchange modules, at the STM exchange modules connector; and (c) when the set up/release of the transmission paths at the step (b) is completed, returning a report message from the STM exchange module connector to the operation center, the report message indicating a completion of set up/release of the transmission paths commanded by the path set up/release command message transmitted at the step (a).

15. The method of claim 1, wherein transmission paths contained in said at least one logical STM transmission line connected from one of the exchange modules to the STM exchange module connector are set up/released by the steps of:

(a) determining a necessity of set up/release of the transmission paths in said at least one logical STM transmission line connected from said one of the exchange modules to the STM exchange module connector at said one of the exchange module connector, and transmitting a path set up/release command message from said one of the exchange modules to the STM exchange module connector, the path set up/release command message commanding the set up/release of the transmission paths in said at least one logical STM transmission line connected from said one of the exchange modules to the STM exchange module connector, and specifying path IDs of the transmission paths to be set up/released in said at least one logical STM transmission line connected from said another one of the exchange modules to the STM exchange module connector;

(b) carrying out the set up/release of the transmission paths having the path IDs specified by the path set up/release command message transmitted at the step (a) in said at least one logical STM transmission line connected from said one of the exchange modules to the STM exchange module connector, at the STM exchange modules connector; and (c) when the set up/release of the transmission paths at the step (b) is completed, returning a report message from the STM exchange module connector to said one of the exchange modules, the report message indicating a completion of set up/release of the transmission paths commanded by the path set up/release command message transmitted at the step (a).

16. A building block type exchange, comprising:

at least one exchange module having a transmission path set up/release function;

an STM exchange module connector having a cross-connect function connected to said at least one exchange module through at least one logical STM transmission line containing at least one logical STM transmission path for transmission of specific data;

an ATM connector connecting to the STM exchange module connector through at least one STM transmission line containing local transmission paths provided in correspondence to said at least one logical STM transmission path for transmission of specific data;

wherein said at least one logical STM transmission path for transmission of specific data is fixedly switched to the logical transmission paths of said at least one STM transmission line by the STM exchange module connector, such that the specific data to be transmitted from said at least one exchange module is transmitted in a form of ATM cells to the ATM connector through said at least one logical STM transmission path for transmission of specific data, the STM exchange module connector, and said at least one STM transmission line, while all the specific data to be transmitted to said at least one exchange module are multiplexed in a form of multiplexed ATM cells at the ATM connector and the multiplexed ATM cells are transmitted from the ATM connector to said at least one exchange module through said at least one STM transmission line, the STM exchange module connector, and said at least one logical STM transmission path for transmission of specific data.

17. The building block type exchanger of claim 16, wherein the specific data include any one of communication data, control data, or operation data.

18. The building block type exchanger of claim 16, wherein said at least one STM transmission line has a transmission capacity equal to a cross-connecting speed of the STM exchange module connector multiplied by an integer.

19. The building block type exchanger of claim 16, further comprising:

additional exchange modules other than said at least one exchange module, each of which is connected to the STM exchange module connector through at least one logical STM transmission line containing at least one logical STM transmission path for transmission of specific data:

wherein the STM exchange module connector cross-connects each logical STM transmission path contained in said at least one logical STM transmission line connected from each one of the additional exchange modules to each logical STM transmission path contained in said at least one logical STM transmission line connected from other ones of the additional exchange modules, such that the specific data to be transmitted to and from said each one of the additional exchange modules are transmitted through said at least one logical STM transmission path for transmission of specific data connected from said each one of the additional exchange modules and the STM exchange module connector.

20. The building block type exchanger of claim 16, further comprising:

additional exchange modules other than said at least one exchange module, each of which is connected to the STM exchange module connector through at least one logical STM transmission line containing at least one logical STM transmission path for transmission of data not belonging to the specific data;

wherein said at least one logical STM transmission line connected from said at least one exchange module also contains at least one logical STM transmission path for transmission of data not belonging to the specific data;

and wherein the STM exchange module connector cross-connects said at least one logical STM transmission path for transmission of data not belonging to the specific data connected from each of the additional exchange modules and said at least one exchange module to said at least one logical STM transmission path for transmission of data not belonging to the specific data connected from other ones of the exchange modules and said at least one exchange module, such that the data not belonging to the specified data to be transmitted to and from said each of the exchange modules and said at least one exchange module are transmitted through said at least one logical STM transmission path for transmission of data not belonging to the specific data connected from said each of the exchange modules and said at least one exchange module and the STM exchange module connector.

* * * * *